United States Patent [19]

May

[11] Patent Number: 4,461,315

[45] Date of Patent: Jul. 24, 1984

[54] PRESSURE PROTECTION SYSTEM
[75] Inventor: Dean W. May, Terre Haute, Ind.
[73] Assignee: J. I. Case Company, Racine, Wis.
[21] Appl. No.: 449,885
[22] Filed: Dec. 15, 1982
[51] Int. Cl.³ .............................................. F16K 17/00
[52] U.S. Cl. ..................................... 137/255; 60/403; 60/410; 60/416; 137/464; 137/509
[58] Field of Search ............... 137/255, 462, 464, 509; 60/403, 410, 415, 416

[56] References Cited

U.S. PATENT DOCUMENTS

| | | | |
|---|---|---|---|
| 2,244,384 | 6/1941 | Bissinger | 60/410 |
| 2,591,641 | 4/1952 | Troendle | 137/255 X |
| 3,971,404 | 7/1976 | Quarve | 137/464 X |
| 4,085,772 | 4/1978 | Roger | 137/464 |

Primary Examiner—Robert G. Nilson
Attorney, Agent, or Firm—Cullen, Sloman, Cantor, Grauer, Scott & Rutherford

[57] ABSTRACT

A pressure protection system including a valve for isolating an auxiliary fluid circuit from a main fluid circuit when a leak occurs in the auxiliary fluid circuit. A valve is connected between a governor controlled compressor and the main fluid circuit and a pressure protection valve is connected between the compressor and an auxiliary fluid circuit. If a leak develops in the auxiliary fluid circuit, the pressure protection valve closes which permits most of the output from the compressor to be used to recharge the main fluid circuit. The pressure protection valve includes a supply passage and a delivery passage disposed substantially perpendicular to the supply passage. A plunger member is movable within the delivery passage for closing the supply passage when there is insufficient fluid pressure in the auxiliary fluid circuit. The pressure protection valve also includes a bypass orifice that permits a small amount of fluid to flow from the supply passage to the delivery passage when the supply passage is closed. If a leak develops in the auxiliary fluid circuit, the main fluid circuit does not lose pressure due to the leak because of the valve in the main fluid circuit. The pressure protection valve is also closed due to insufficient pressure because of a leak in the auxiliary fluid circuit and only a small portion of the compressor output is leaked through the bypass orifice in the pressure protection valve. This permits the main fluid circuit to be maintained at its peak operating pressure for maximum efficiency regardless of the fluid pressure condition in the auxiliary fluid circuit.

3 Claims, 2 Drawing Figures

U.S. Patent        Jul. 24, 1984        4,461,315
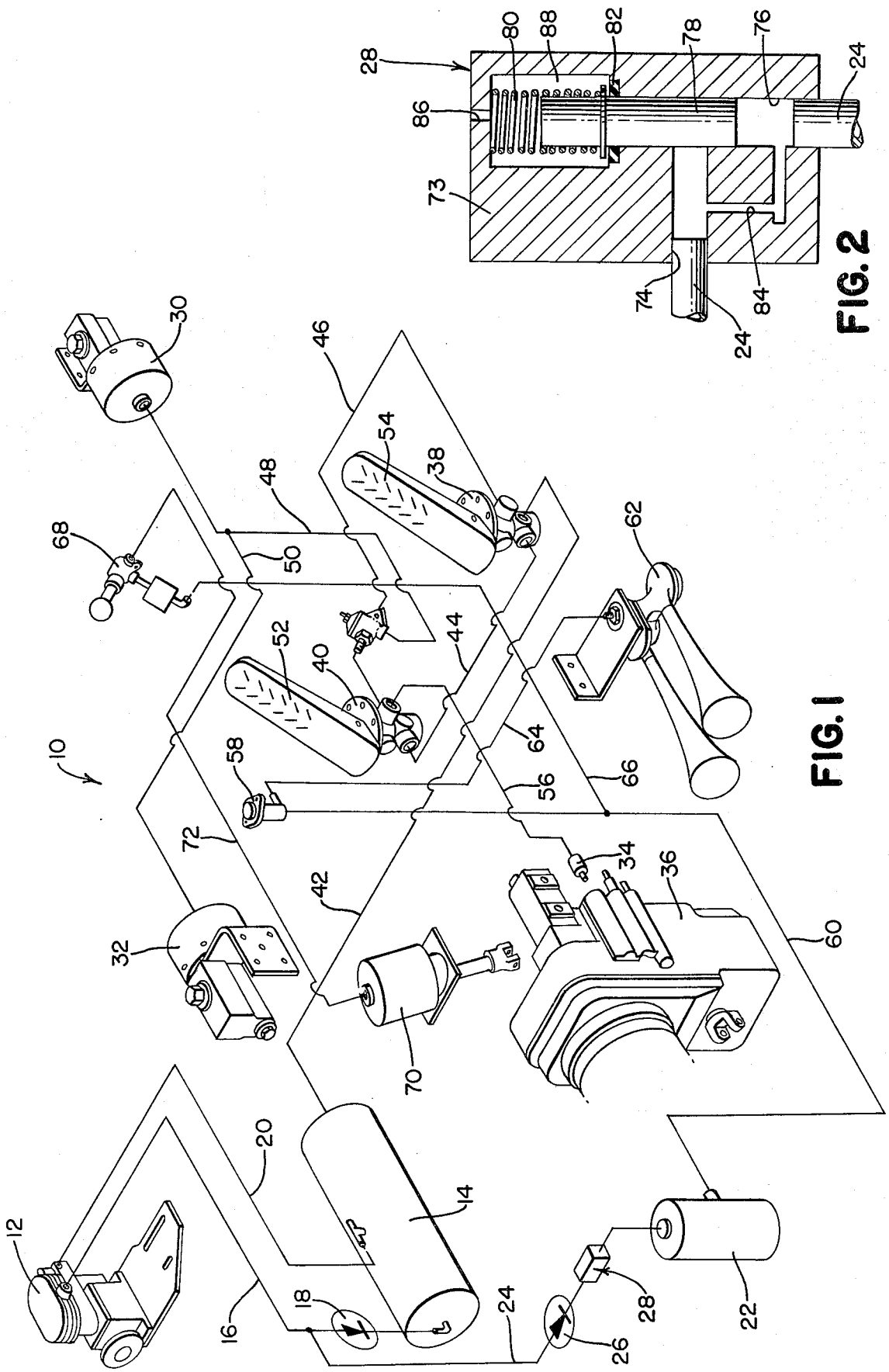

PRESSURE PROTECTION SYSTEM

BACKGROUND OF THE INVENTION

The present invention relates to a system for protecting a main fluid circuit from an auxiliary fluid circuit should a leak develop in the auxiliary fluid circuit.

It is known to provide a fluid control system for earth-working machines including a main air circuit for operating components such as the service brake valves and the transmission cut-out valve and an auxiliary air circuit for operating components such as the parking valve, air horn, and other accessories. If a leak develops, for example, in the auxiliary air circuit and no pressure protection exists for the control system, the main air circuit can become inoperable since the two fluid circuits are integrated together. Since it is desirable that certain components, such as the service brakes, always have a supply of pressurized fluid available for their operation, there is a need for the fluid control system to at least include some means for protecting the fluid pressure in the main air circuit.

There have been pressure protection devices which offer a certain amount of protection, however, they do not permit the main fluid circuit to attain its peak operating pressure because they open at a pressure well below the maximum system pressure. These known devices cause the air compressor to run continuously as the system cycles between the opening and closing pressure settings. Thus, there has been a need for a system that protects the main fluid circuit from leaks in the auxiliary fluid circuit while permitting the main fluid circuit to maintain its peak operating pressure for maximum efficiency.

SUMMARY OF THE INVENTION

In accordance with the present invention, a fluid control system is disclosed including a pressure protection valve for isolating an auxiliary fluid circuit from a main fluid circuit when a leak occurs in the auxiliary fluid circuit.

The fluid control system operates the conventional brake valves, transmission clutch cut-out valve, parking brake system, and other pneumatically operated accessories of an earth-working machine. The control system includes an air compressor which directs air under pressure to a main reservoir through a check valve. As is conventional, the air pressure in the main reservoir is transmitted back to the compressor through a governor feedback line. If the air pressure in the main reservoir drops below a predetermined level, the compressor is actuated to recharge the main reservoir. The compressor also directs air under pressure to an auxiliary reservoir through a check valve and pressure protection valve.

The main reservoir supplies air for the operation of brake actuators and a clutch cut-out valve which is connected to the transmission for the machine. The auxiliary reservoir is connected to fluid operated accessories such as the parking brake control valve and air horn. The fluid control system is designed to protect the main fluid circuit consisting of the main reservoir, service brake valves, service brake actuators, and transmission clutch cut-out valve from the auxiliary fluid circuit comprising the auxiliary reservoir, air horn, parking brake control valve, and parking brake actuator, should a leak develop in the auxiliary fluid circuit. A check valve is connected between the compressor and main reservoir and a pressure protection valve is connected between the compressor and auxiliary reservoir. If a leak develops in the auxiliary fluid circuit, the pressure protection valve closes which permits most of the output from the compressor to be used to recharge the main fluid circuit.

The pressure protection valve includes a valve body having a supply passage connected to the compressor and a delivery passage connected to the auxiliary reservoir. The longitudinal axis of the supply passage is substantially perpendicular to the longitudinal axis of the delivery passage. A plunger member is movable within the delivery passage for closing the supply passage when there is insufficient air pressure in the auxiliary fluid circuit. The air pressure in the auxiliary fluid circuit acts on one end of the plunger member while a spring acts against its opposite end. The supply passage is opened for full fluid communication with the delivery passage when the air pressure in the auxiliary fluid circuit overcomes the spring force acting on the plunger member. If there is insufficient pressure in the delivery passage from the auxiliary fluid circuit, the plunger member is moved by its spring for closing the supply passage.

The air pressure through the supply passage has no affect on the movement of the plunger member because the supply pressure acts perpendicularly against the side of the plunger member. The pressure protection valve also includes an internal bypass orifice that permits a small amount of air to flow from the supply passage to the delivery passage when the supply passage is closed. If there are no leaks in the auxiliary fluid circuit, the fluid pressure in the delivery passage will increase due to the air being delivered through the orifice until sufficient pressure exists in the delivery passage to overcome the force of the spring on the plunger member thereby moving the plunger member and opening the supply passage to the delivery passage. Thus, full air flow between the supply and delivery passages is only permitted if there is no leak in the auxiliary fluid circuit.

If a leak develops in the auxiliary fluid circuit, the pressure protection valve closes when the delivery side pressure falls below the pressure required to oppose the spring force action on the plunger. The main fluid circuit does not lose pressure due to the leak because of the check valve on the main reservoir. As the air pressure in the main reservoir drops below a predetermined governor cut-in setting due to the application of service brakes or the like, the compressor will be actuated to recharge the main reservoir. With the pressure protection valve closed, only a small portion of the compressor output would leak through the bypass orifice in the pressure protection valve. Thus, most of the output from the compressor would be used to recharge the main fluid circuit until the predetermined governor cut-out pressure is reached, at which point the compressor would stop delivering air to the main reservoir. This permits the main fluid circuit to be maintained at its peak operating pressure for maximum efficiency regardless of the fluid pressure condition in the auxiliary fluid circuit.

Other advantages and meritorious features of the pressure protection system will be more fully understood from the following description of the preferred embodiment, the appended claims, and the drawings, a brief description of which follows.

BRIEF DESCRIPTION OF DRAWINGS

FIG. 1 is a schematic illustration of a fluid control system for an earth-working machine including a main fluid circuit, an auxiliary fluid circuit, and a system for pressure protection for the main fluid circuit.

FIG. 2 is a cross-sectional view of the pressure protection valve which forms part of the pressure protection system.

DETAILED DESCRIPTION OF THE INVENTION

FIGS. 1-2 illustrate a control system 10 for the brake valves, transmission clutch cut-out valve, parking brake system, and other pneumatically operated accessories of an earth-working machine. Control system 10 includes an air compressor 12 which directs air under pressure to main reservoir 14 through compressor discharge line 16 and check valve 18. As is conventional, the air pressure in main reservoir 14 is transmitted to compressor 12 through governor feedback line 20. If the air pressure in the main reservoir 14 drops below a predetermined level, compressor 12 is actuated to recharge reservoir 14. Compressor 12 also directs air under pressure to auxiliary reservoir 22 through line 24, check valve 26, and pressure protection valve 28, as will be described.

Main reservoir 14 supplies air for the operation of front and rear brake actuators 30 and 32 and the clutch cut-out valve 34 which is connected to transmission 36. Brake actuators 30 and 32 are conventional assemblies including an air chamber and a hydraulic master cylinder. The compressed air from reservoir 14 acts on a piston and pushrod in the air chamber and the pushrod, in turn, acts on a piston in the master cylinder to build up pressure in a conventional brake hydraulic system connected to each brake actuator. The clutch cut-out valve 34 is also a conventional element for disengaging transmission 36 during certain operations of the machine.

Reservoir 14 is connected to brake valves 38 and 40 by lines 42 and 44. Valves 38 and 40 are, in turn, connected to brake actuators 30 and 32 by lines 46, 48 and 50. Depression of brake pedal 52 or brake pedal 54 opens the corresponding brake valve 38 or 40 to meter air from reservoir 14 for delivery to brake actuators 30 and 32. In some loading operations, it is desirable to disengage transmission 36 to make maximum engine power available. Brake valve 40 is connected to clutch cut-out valve 34 by line 56 to provide a convenient means of temporarily disengaging the transmission 36 while the brakes are applied. If brake pedal 52 is depressed, pressurized air is directed to clutch cut-out valve 34 on transmission 36 for shifting a spool in a conventional control valve within transmission 36 for causing the clutches in the transmission to dump hydraulic fluid thereby disengaging transmission 36.

Auxiliary reservoir 22 is connected to horn valve 58 by line 60 and valve 58 is connected to air horn 62 by line 64. Reservoir 22 is also connected by line 66 to a parking brake control valve 68 which, in turn, is connected to a conventional spring-applied, air-released parking brake actuator 70 by line 72. When the control valve 68 is opened, air pressure from reservoir 22 is directed to actuator 70 for releasing a conventional parking brake.

Control system 10 is designed to protect the main air circuit consisting of reservoir 14, brake valves 38 and 40, brake actuators 30 and 32, and transmission clutch cut-out valve 34 from the auxiliary air circuit comprising reservoir 22, horn valve 58, air horn 62, parking brake control valve 68, and parking brake actuator 70, should a leak develop in the auxiliary air circuit. As illustrated in FIG. 1, a check valve 18 is connected between compressor 12 and main reservoir 14 and the pressure protection valve 28 is connected between compressor 12 and auxiliary reservoir 22. If a leak develops in the auxiliary air circuit, pressure protection valve 28 closes which permits most of the output from compressor 12 to be used to recharge the main air circuit.

Referring to FIG. 2, pressure protection valve 28 includes a valve body 73 having a supply passage 74 connected to check valve 26 and a delivery passage 76 connected to auxiliary reservoir 22. The longitudinal axis of passage 74 is substantially perpendicular to the longitudinal axis of passage 76. A plunger member 78 is movable within passage 76 for closing passage 74, as shown in FIG. 2, when there is insufficient air pressure in the auxiliary air circuit. The air pressure in the auxiliary air circuit acts on one end of plunger member 78 while spring 80 acts against its opposite end. Passage 74 is opened for full fluid communication with passage 76 when the air pressure in the auxiliary air circuit overcomes the spring force acting on plunger member 78. If there is insufficient air pressure in the delivery passage 76 of the auxiliary air circuit, plunger member 78 is moved by spring 80 for closing supply passage 74.

As illustrated, the supply side pressure through passage 74 has no affect on the movement of plunger member 78 because the supply pressure acts against the side of member 78. Pressure protection valve 28 also includes an internal bypass orifice 84 that permits a small amount of air to flow from supply passage 74 to delivery passage 76 when supply passage 74 is closed. Further, a vent opening 86 is provided in valve body 73 to prevent air pressure from building up in cavity 88 particularly when plunger member 78 retracts. Seal 82 prevents air pressure from escaping into cavity 88 and through vent 86.

As described, when valve 28 is closed as shown in FIG. 2, a small amount of air is directed from supply passage 74 to delivery passage 76 through orifice 84. If there are no leaks in the auxiliary air circuit, the air pressure in delivery passage 76 will increase due to the air being delivered through orifice 84. When sufficient pressure exists in passage 76 to overcome the force of spring 80 on plunger member 78, plunger member 78 retracts and opens supply passage 74 to delivery passage 76. Thus, full air flow between passages 74 and 76 is prevented if there is a leak in the auxiliary air circuit.

If a leak develops in the auxiliary air circuit, the main air circuit does not lose pressure due to the leak because of the check valve 18 on main reservoir 14. As the air pressure in the main reservoir 14 drops below a predetermined governor cut in setting due to the application of service brakes and the like, compressor 12 will be actuated to recharge main reservoir 14. Pressure protection valve 28 would be closed due to insufficient pressure because of the leak in the auxiliary air circuit and only a small portion of the compressor output would leak through the bypass orifice 84 in pressure protection valve 28. Thus, most of the output from compressor 12 would be used to recharge the main air circuit until the predetermined governor cut-out pressure is reached, at which point compressor 12 would stop delivering air. This permits the main air circuit to be maintained at its peak operating pressure for maximum efficiency regardless of the air pressure condition in the auxiliary air circuit.

It will be apparent to those skilled in the art that the foregoing disclosure is exemplary in nature rather than limiting, the invention being limited only by the appended claims.

I claim:

1. A pressure protection system for protecting a main fluid circuit from an auxiliary fluid circuit should a leak develop in the auxiliary fluid circuit, said pressure protection system including fluid compression means having a discharge for directing fluid under pressure to a main reservoir and to an auxiliary reservoir, said main reservoir connected to a first set of fluid operated components for forming said main fluid circuit and said auxiliary reservoir connected to a second set of fluid operated components for forming said auxiliary fluid circuit, valve means connected between the discharge of said fluid compression means and said main reservoir and the fluid pressure in said main reservoir being transmitted by a governor feedback line to said fluid compression means, pressure protection valve means connected between the discharge of said fluid compression means and said auxiliary reservoir, said pressure protection valve means including a valve body having a supply passage connected to the discharge of said fluid compression means and a delivery passage connected to said auxiliary reservoir, the longitudinal axis of said supply passage being substantially perpendicular to the longitudinal axis of said delivery passage, a spring biased plunger member movable within said delivery passage for closing said supply passage when the fluid pressure in the delivery passage drops below a predetermined level, and a bypass orifice connecting said supply passage and said delivery passage permitting a small amount of fluid to flow from said supply passage to said delivery passage when said supply passage is closed.

2. The pressure protection system as defined in claim 1 wherein the fluid pressure within said delivery passage acting against one end of said plunger member and spring means acting against the opposite end of said plunger member, and said supply passage being opened for fluid communication with said delivery passage when the fluid pressure in said delivery passage exceeds the force of said spring means.

3. The pressure protection system as defined in claim 2 wherein the longitudinal axis of said supply passage being substantially perpendicular to the longitudinal axis of said plunger member whereby the fluid pressure in said supply passage having no affect on the movement of said plunger member.

* * * * *